(12) United States Patent
Ruggiero et al.

(10) Patent No.: US 7,778,156 B2
(45) Date of Patent: Aug. 17, 2010

(54) DEVICE AND METHOD FOR IMPROVING SWITCHING TIME OF SECTION/LINE AND EQUIPMENT PROTECTIONS

(75) Inventors: Antonio Ruggiero, Sesto San Giovanni (IT); Paolo Sorge, Carugate (IT); Luca Razzetti, Sesto San Giovanni (IT)

(73) Assignee: Alcatel, Paris (FR)

( * ) Notice: Subject to any disclaimer, the term of this patent is extended or adjusted under 35 U.S.C. 154(b) by 1391 days.

(21) Appl. No.: 11/004,060

(22) Filed: Dec. 6, 2004

(65) Prior Publication Data

US 2005/0220010 A1 Oct. 6, 2005

(30) Foreign Application Priority Data

Apr. 5, 2004 (EP) ................................. 04290901

(51) Int. Cl.
*H04L 12/28* (2006.01)
(52) U.S. Cl. ..................................................... 370/216
(58) Field of Classification Search ......... 370/216–220, 370/225, 227, 228, 907
See application file for complete search history.

(56) References Cited

U.S. PATENT DOCUMENTS

| | | | | |
|---|---|---|---|---|
| 6,625,115 B1 * | 9/2003 | Ikeda et al. | ................. | 370/217 |
| 6,751,189 B1 * | 6/2004 | Gullicksen et al. | .......... | 370/216 |
| 7,158,477 B2 * | 1/2007 | Fatica et al. | ................. | 370/216 |
| 7,248,561 B2 * | 7/2007 | Ishibashi et al. | ............ | 370/228 |
| 2003/0084367 A1 * | 5/2003 | Suemura | ........................ | 714/4 |
| 2004/0047286 A1 | 3/2004 | Larsen et al. | | |

FOREIGN PATENT DOCUMENTS

EP 1 324 521 A1 7/2003

OTHER PUBLICATIONS

G.707 ITU-T standard Mar. 1996, title and annex C, 18 pages.*
G.841 ITU-T standard, title and chapters 6-8, 71 pages.*

* cited by examiner

*Primary Examiner*—Dmitry H Levitan
(74) *Attorney, Agent, or Firm*—Sughrue Mion, PLLC (57) ABSTRACT

Disclosed is a device for providing an improved switching from one of two or more working resources to at least one spare resource in a telecommunication apparatus, each of the working resources comprising a profile with a set of parameters and configuration information, wherein the at least one spare resource comprises a bank of profiles, each profile of the bank corresponding to a profile of the working resources, and further comprises means for selecting a profile of the bank so that when a working resource has to be replaced by a spare resource, a profile in the bank corresponding to the profile of the working resource is selected for provisioning the spare resources accordingly. According to an embodiment, the working and spare resources are embodied in ports of a telecommunication apparatus.

15 Claims, 7 Drawing Sheets

DEVICE AND METHOD FOR IMPROVING SWITCHING TIME OF SECTION/LINE AND EQUIPMENT PROTECTIONS

BACKGROUND OF THE INVENTION

1. Field of the Invention

The present invention relates to the protection of telecommunication apparatus, such as ADMs, DXCs, multiservice apparatus, metro apparatus or the like. In particular, the present invention relates to a device and method for reducing the switching time of section/line and equipment protections in such apparatus.

Whilst the present invention is applicable to Synchronous Digital Hierarchy (SDH), Synchronous Optical Networking (SONET) and Optical Transport Networks (OTN), it will be described, just for clarity reasons, mainly with reference to SDH/SONET Standards.

This application is based on, and claims the benefit of, European Patent Application No. 04290901.0 filed on Apr. 5, 2004, which is incorporated by reference herein.

2. Description of the Prior Art

As it is known, a network element, for instance an ADM (Add/Drop Multiplexer) or a DXC (Digital Cross Connect) comprises one or more input/output ports, backpanel connections and one or more switching matrices. The ports receive input flows in the form of frames.

Configurations are known in which many Section/Line and Path functions are carried out at the ports instead of at the matrices. This is convenient because it results in lower complexity at the matrices.

The problem is provisioning the ports with the proper parameters and information for protection purposes. In fact, as far as protection is concerned, typically there are a number of working resources and one or more spare resources. Each of the working resources is configured in a certain way with certain parameters. The spare resources are either properly configured (for extra traffic) or are free of any configuration, namely are ready to be configured according to the working resource to be replaced.

For instance, in a SDH/SONET MSP 3:1 configuration, three working and one spare line resources are available. The single spare resource, when the network is in the idle state, may carry extra traffic and is configured independently from the other three working resources. Also each of the working resources is configured in a way that is independent from the others. When a fail occurs in one of the three working resources, if necessary the extra traffic is squelched by inserting AIS and the spare resource is utilized for transporting the high priority traffic of the failed working resource. Thus, at that time, the spare resource should be properly configured correspondingly to the failed working resource that is replaced. It may happen that the spare resource is completely differently configured from the working one and this results in a high number of registers to be software updated in a very short time. The registers, of the order of thousands (e.g. when they are at Path level for an OC-768), have to be updated in a very short time in order to comply with the Standard requirements. The differences between two configurations could be for instance in terms of AU concatenation level, monitoring settings (e.g. Trace Identifiers) and others.

With the above in mind, a first technical problem is related to the need to improve switching time capabilities in case of Section/Line protections in SDH, SONET and OTN applications. The target is to significantly increase the reliability of a transmission network reducing switching time. In other words, the technical problem is to define a method and device to boost-up the reconfiguration of Section/Line, and Path blocks and corresponding parameters as they are defined in the relevant standards.

It is also known that there are provided apparatus boards carrying out functionalities that originate and terminate at the matrices of an apparatus. Such a functionality could be, for instance, an Higher Order vs Lower Order Adaptation functionality. Also in that case, one or more spare resources are provided for protecting a number of working resources. Generally, when the apparatus is in the idle state, the spare resources are in stand-by, ready to replace a working resource when a fail occur. So, when the spare resource is activated, it should be configured according to the working resource which is replacing (it is not known in advance which of the working resource will become failed). The new configuration is presently software made and takes a time which is significantly affecting the overall reliability of the transmission network. So, also for apparatus protections, there is the need to reduce the switching times.

The problem of re-arrangements caused by network protection switching has been already addressed and two are the main solutions that are known to the Applicant.

The first solution (as mentioned above) is simply based on dynamic processing and reconfiguration of all the parameters involved in Section/Line, and Path blocks. This reconfiguration, independently from any architectural approach, requires long time due to its complexity. This finally increases the overall switching time. The first solution requires the reconfiguration of all Section/Line, and Path blocks during the protection action. Since these actions are traffic affecting, the longer this phase the longer the switching time and the lower the network reliability. Furthermore, the first solution would even not be able to match switching time requirements for STM-256 or STS-192 due to the increasing number of parameters to be reconfigured during the switch.

The second solution (which avoids re-arrangements) consists in implementing a "centralized" architecture identical to what is described in ITU-T G-783. This second solution is not scalable because when the equipments manage a large number of Path tributaries, the matrix board becomes more and more complex. Current levels of integration at equipment level are not reachable with this solution. Furthermore, the second solution is highly expensive and space/power consuming when implemented with the ASIC devices according to the status of the art.

The above and further problems are solved by a device and method according to claims 1 and 9, respectively. Further advantageous features are set forth in the respective dependent claims. All the claims are deemed to be an integral part of the present description.

SUMMARY OF THE INVENTION

The basic idea according to the present invention consists in calculating all the possible parameters of a certain Section/Line and Path block off the switching phase, storing those parameters in a memory close to the relevant devices and just selecting the needed ones during the switching phase. This guarantees a faster switching time and a highly scalable solution.

According to a first aspect, the present invention provides a device for providing an improved switching from one of two or more working resources to at least one spare resource in a telecommunication apparatus, each of the working resources comprising a profile with a set of parameters and configuration information, wherein the at least one spare resource comprises a bank of profiles, each profile of the bank corresponding to a profile of the working resources, and further comprises means for selecting a profile of the bank so that when a working resource has to be replaced by a spare resource, a profile in the bank corresponding to the profile of the working resource is selected for provisioning the spare resources accordingly.

According to an embodiment, the working and spare resources are embodied in ports of a telecommunication apparatus.

According to a further embodiment, the working and spare resources are embodied in boards carrying out functionalities that are both originated and terminated at apparatus matrices.

Typically, said bank comprises a memory, possibly divided in a number of portions with each portion corresponding to a single profile.

Said set of parameters and configuration information comprises concatenation information.

Furthermore, said set of parameters and configuration information comprises also Path adaptation, monitoring, termination and tandem connection functions information.

According to a profitable embodiment, said selecting means are respondent to an in-band signaling coming back from the apparatus matrix which is carrying out the protection switch.

The apparatus could be a network element such as an ADM, a DXC or the like.

According to a second aspect, the present invention provides a method for providing an improved switching from one of two or more working resources to at least one spare resource in a telecommunication apparatus, each of the working resources comprising a profile with a set of parameters and configuration information, characterized by the step of providing the at least one spare resource with a bank of profiles, each profile of the bank corresponding to a profile of the working resources, and further by the step of providing selector means for selecting a profile of the bank so that when a working resource has to be replaced by a spare resource, a profile in the bank corresponding to the profile of the working resource is selected for provisioning the spare resource accordingly.

The present invention will become clear after reading the following description, given by way of example and not of limitation, in connection with the annexed drawings.

BEST MODE FOR CARRYING OUT THE INVENTION

Figure 1:
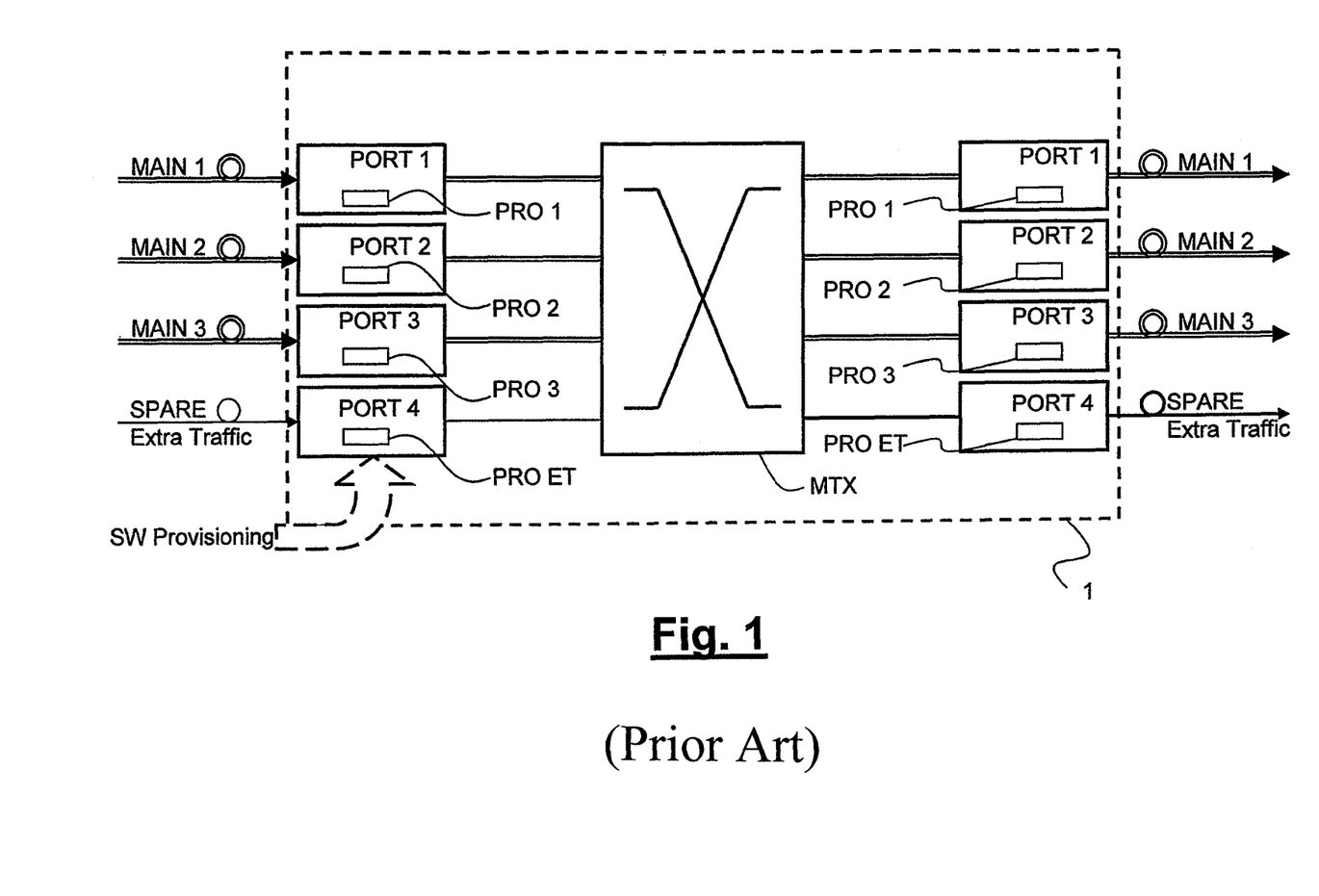
FIG. 1 shows an apparatus according to the state of the art in the idle state.

The present invention will be explained with reference to specific examples. FIG. 1 diagrammatically shows an apparatus 1 according to the prior art. Such an apparatus 1 could be an ADM or a DXC and comprises a number of input/output ports PORT1, PORT2, ..., PORT4 and a fabric switch MTX. A MSP 3:1 protection is established: thus, three working lines (MAIN1, MAIN2, MAIN3) and one spare (or protecting) line (SPARE) are provided. In the idle state, the spare line carries extra (low priority) traffic. Each port of working lines is properly provisioned (PRO1, PRO2, PRO3) in a fixed way. On the contrary, the port of the spare line is provisioned in a way that could be changed. In other words, the port of the spare line is provisioned for the extra traffic but it can be differently provisioned when it is used for one of the working lines.

For instance, PORT1 (an STM-64) could be provisioned for MAIN1 line as "64XAU4 not concatenated"; PORT2 (another STM-64) could be provisioned for MAIN2 line as "16XAU4-4c"; PORT3 (another STM-64) could be provisioned for MAIN3 line as "4XAU4-16c"; and PORT4 (another STM-64) could be provisioned for MAIN4 line as "1XAU4-64c". The provisions could affect also other parameters and information.

Figure 2:
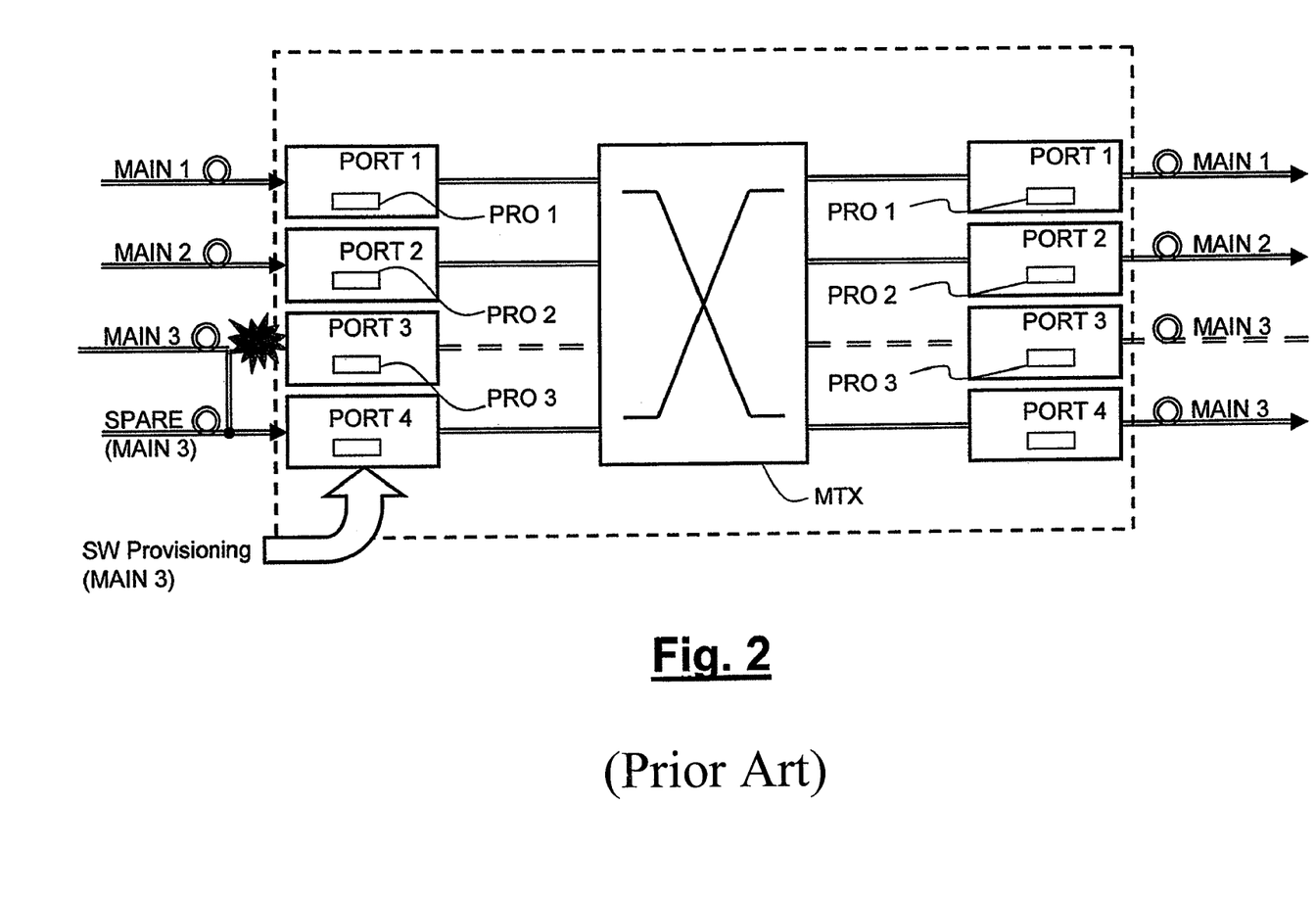
FIG. 2 shows an apparatus according to the state of the art with one failed working resource.

When a fail occur (see FIG. 2), the spare resource is used for the failed working resource (MAIN3, in this case) and the port provisioning should change at least from "1XAU4-64c" to "4XAU4-16c". This action may result in updating thousands of registers through software. This finally negatively increases the overall switching time.

The basic idea according to the present invention consists in calculating all the possible parameters of a certain Section/Line (including Path blocks) off the switching phase, storing those parameters in a memory close to the relevant devices and just selecting the needed ones during the switching phase.

Thus, a partitioned memory RAM is provided for storing provisioning parameters (also termed "profile") of the working resources. Each partition of the memory is reserved for storing the provisioning parameters of each working resource. A profile of the signal that is going to be protected is automatically selected when a fail occur.

For instance, for MSP N:1 Section protection as it is described in ITU-T G.841, the protecting section must gather all the profiles of all the N-working sections of the same protection group. Only the profile corresponding to the currently protected working section is selected during the switch. These profiles contain all the parameters of a certain Section/Line (including Path parameters). In such a way, the processing needed to compute all the possible parameters of Section/Line, Path blocks is not performed during the switch but it is performed off-line saving time for the switch phase.

During the switching phase, only the selection of the profile is performed via an index named Page.

Figure 6:
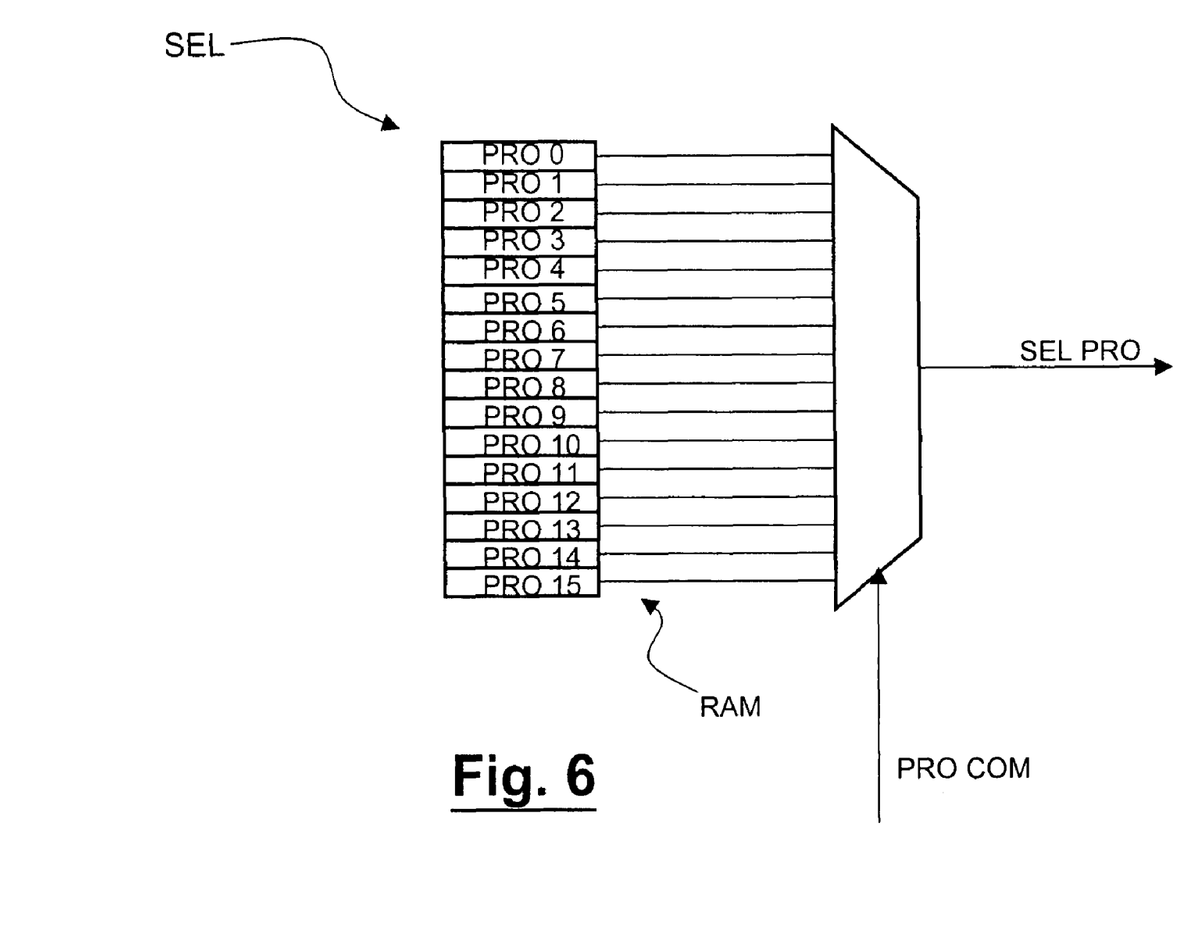
FIG. 6 shows a selector to be used in connection with the present invention.

FIG. 6 shows a selector SEL according to the present invention. In particular, the selector receives a profile command PRO_COM, selects one of the available profiles (PRO1 to PRO15) according to the failed working resource and outputs a selected profile SEL_PRO. Thus, it switches from the profile of the spare resource PRO0 to one of the profiles of the working resources PRO1 to PRO15.

Figure 3:
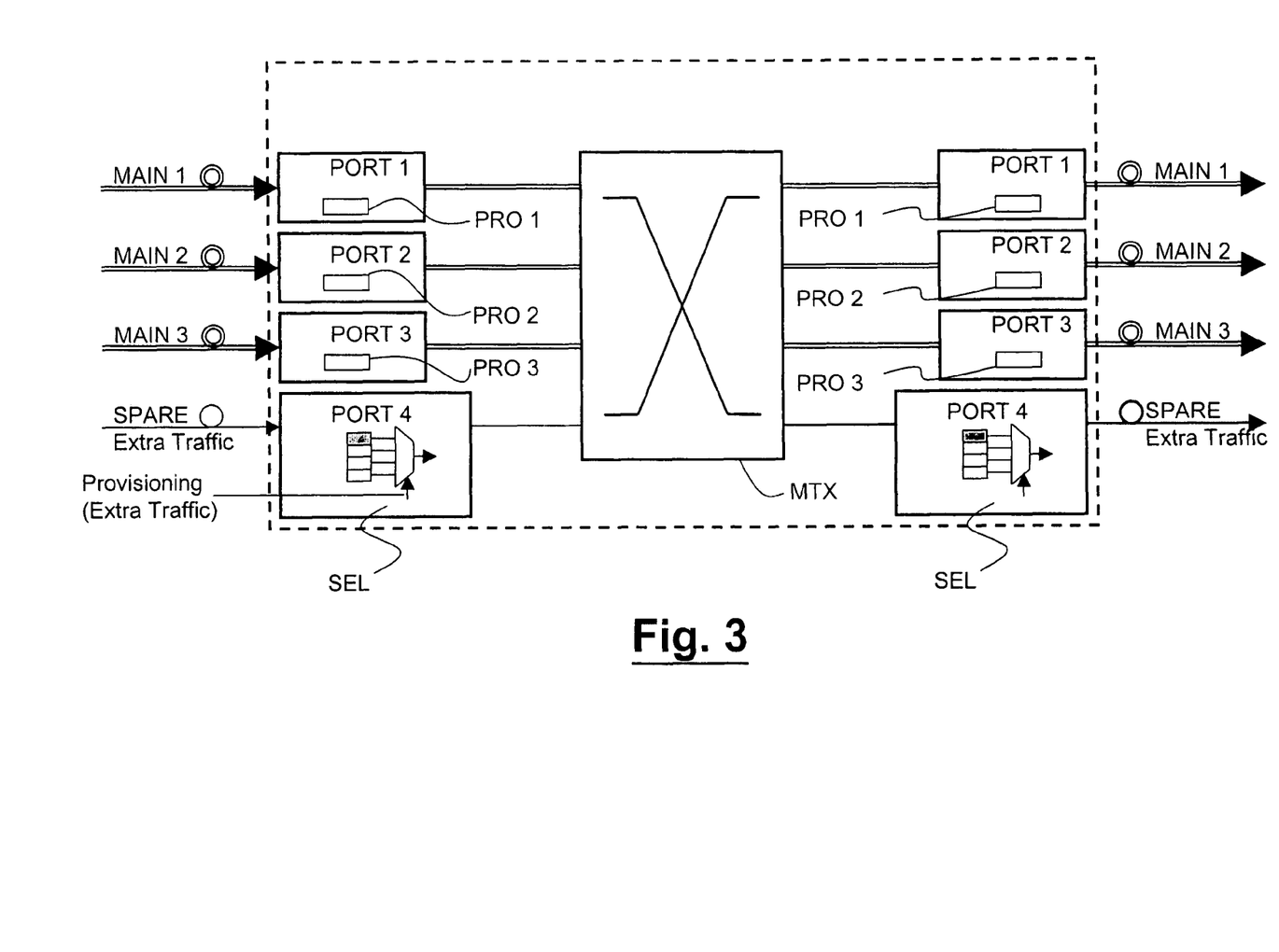
FIG. 3 shows an apparatus according to one embodiment of the present invention in the idle state.
Figure 4:
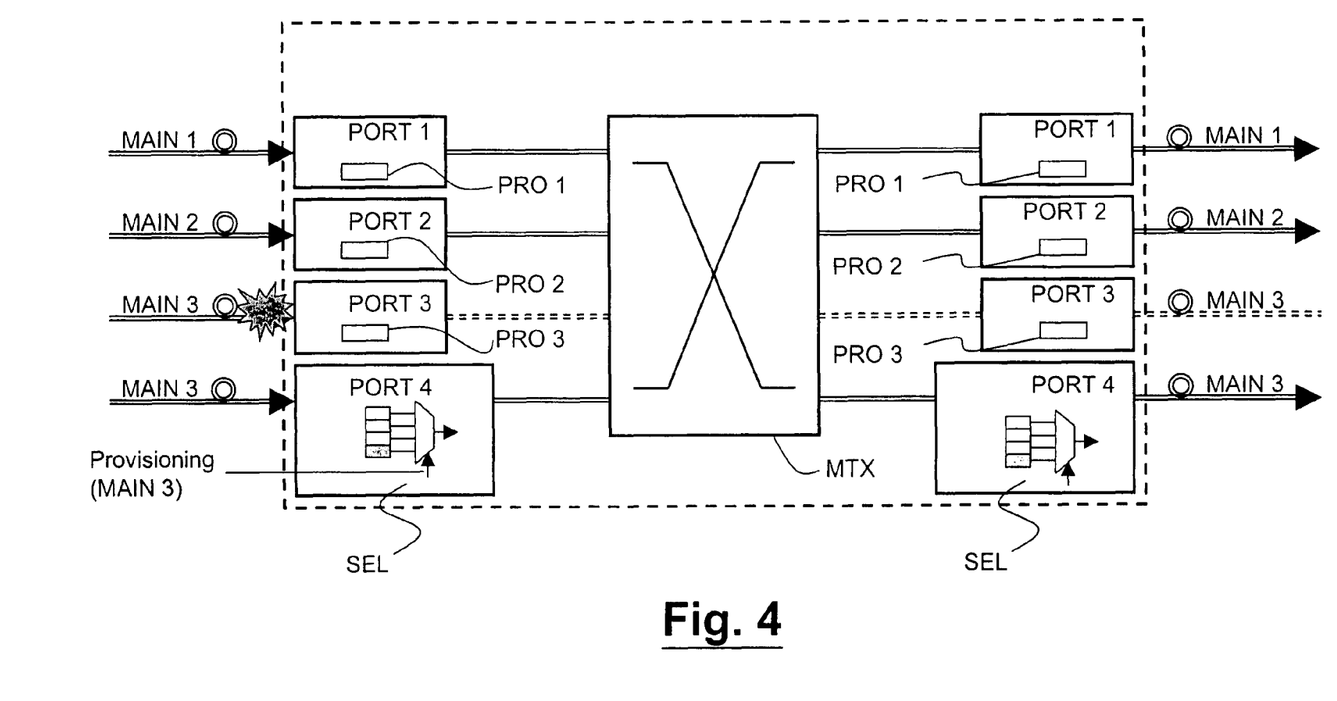
FIG. 4 shows an apparatus according to one embodiment of the present invention with one failed working resource.

FIG. 3 shows an apparatus embodying the present invention in the idle state. The apparatus is similar to the one according to the prior art except for PORT4 of the spare resource. PORT4 comprises the selector as shown in FIG. 6. When in the idle state, it is provisioned with the provisioning profile for extra traffic. When a fail occur, for instance MAIN3 becomes failed (FIG. 4) the corresponding profile is selected. This is a very simple and prompt operation because only one register should be updated (the one acting on the selector). The profiles are stored in the memory at the set up of the apparatus and not when a fail occur, thus resulting in a reduced time switching.

Figure 5:
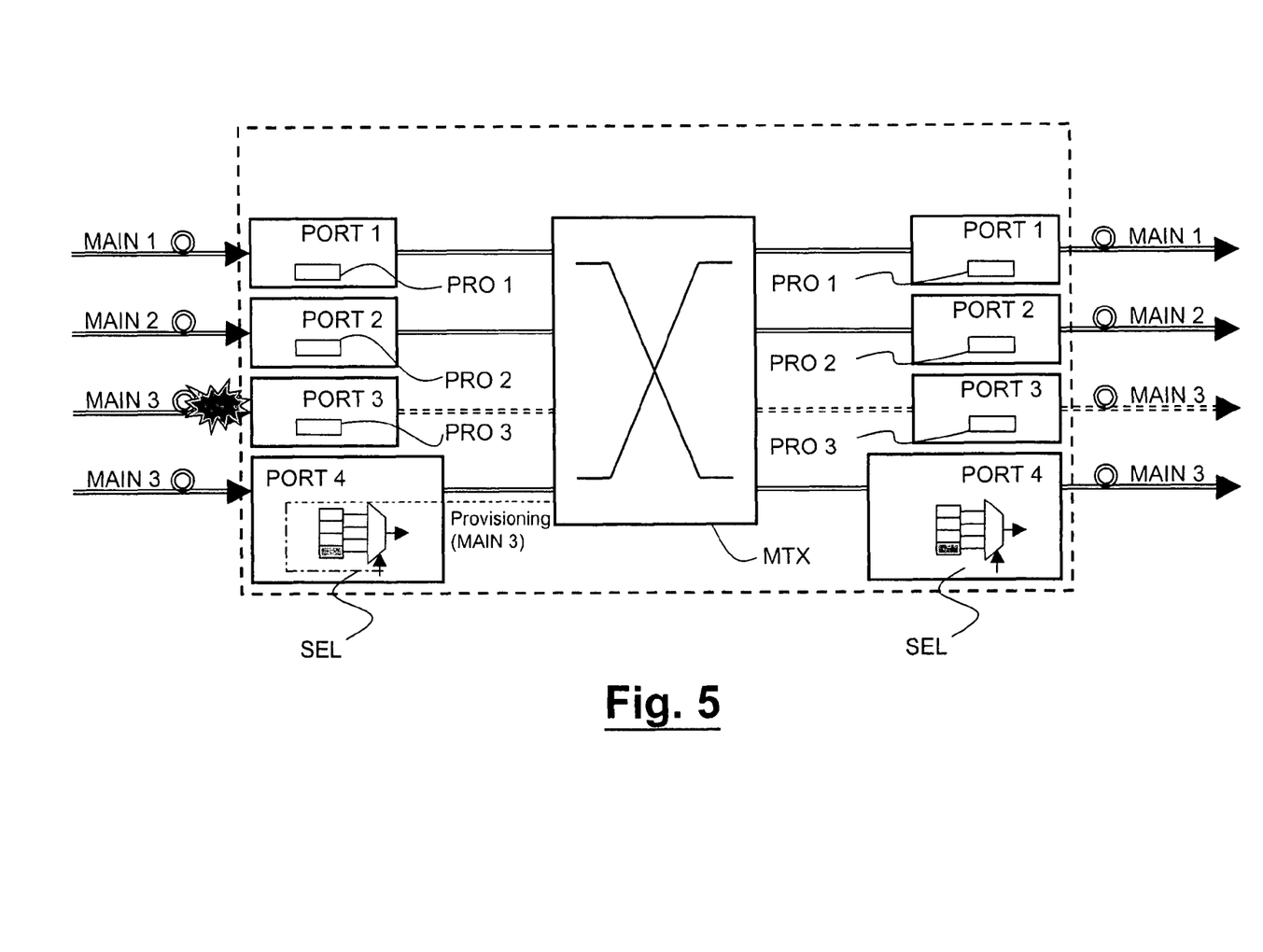
FIG. 5 shows an apparatus according to another embodiment of the present invention with one failed working resource.

The command for a new provisioning profile could be given through software or by an in-band signaling as shown in FIG. 5 coming from the switching matrix MTX.

Figure 7:
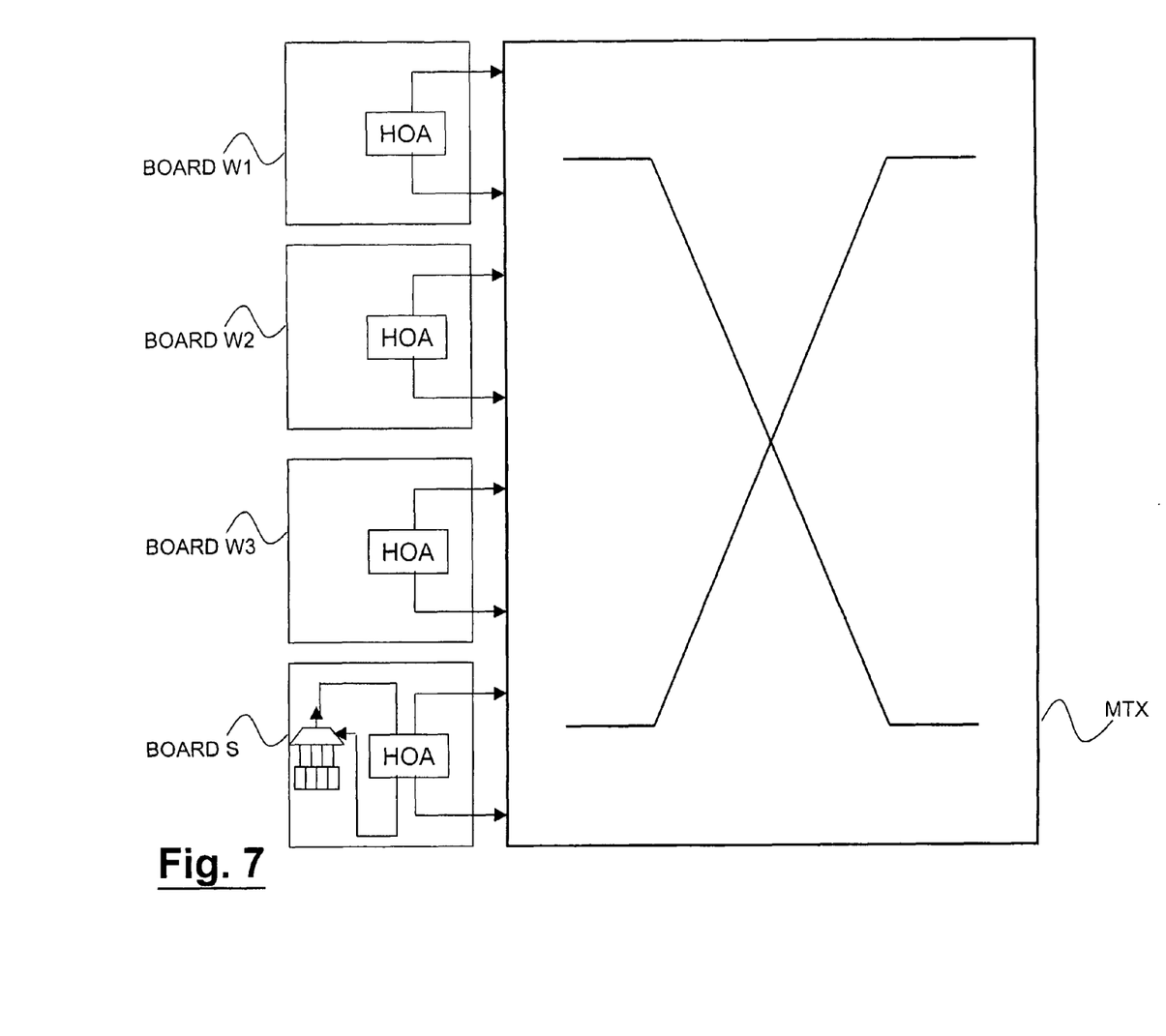
FIG. 7 shows a fabric switch and a number of Adaptation boards connected thereto wherein one of the boards comprises the selector according to the present invention.

The present invention, as mentioned above, is applicable to ports or other resources that are protected against fails. An example thereof is shown in FIG. 7. In FIG. 7 there is shown a matrix and a number of boards. A number of such boards (BOARD_W1, BOARD_W2, BOARD_3) are working and there is provided a spare board BOARD_S. Each of the boards performs a Higher Order vs Lower Order Adaptation function which is originated and terminated at the switching matrix. Also in the arrangement of FIG. 7, when a working board becomes failed, the spare one takes the place of it and should be provisioned accordingly. According to the present invention, a selector and memory device is provided for storing a number of provisioning profiles and selecting the proper one when necessary.

The new solution results in a number of advantages, including the following. From one side the switching time is boosted-up and the network reliability is improved. From the other side, the present invention is not dependent from technology (SDH/SONET) and hierarchy (AU4, STS . . . ). The mechanism according to the present invention can be applied to OTN (WDM) technology as well.

We claim:

1. A device for providing an improved switching from one of two or more working resources to at least one spare resource in a telecommunication apparatus, each of the working resources comprising a profile with a set of parameters and configuration information, wherein the at least one spare resource comprises a bank of profiles, each profile of the bank corresponding to a profile of the working resources, and wherein the at least one spare resource further comprises means for selecting a profile of the bank so that when a working resource has to be replaced by a spare resource, a profile in the bank corresponding to the profile of the working resource is selected for provisioning the spare resources accordingly.

2. The device according to claim 1, wherein the working and spare resources are embodied in ports of a telecommunication apparatus.

3. The device according to claim 1, wherein the working and spare resources are embodied in boards which perform Adaptation functions that are both originated and terminated at apparatus matrices.

4. The device according to claim 1, wherein said bank comprises a memory that is divided into a number of portions with each portion corresponding to a single profile.

5. The device according to claim 1, wherein said set of parameters and configuration information comprises concatenation information.

6. The device according to claim 1, wherein said set of parameters and configuration information comprises adaptation, termination, and monitoring information.

7. The device according to claim 1, wherein the apparatus comprises at least one of an Add/Drop Multiplexer (ADM), a Digital Cross Connect (DXC), a multiservice apparatus and a metro apparatus.

8. An apparatus comprising a device according to claim 1.

9. A method for providing an improved switching from one of two or more working resources to at least one spare resource in a telecommunication apparatus, each of the working resources comprising a profile with a set of parameters and configuration information, wherein the method comprises:

providing said at least one spare resource with a bank of profiles, each profile of the bank corresponding to a profile of the working resources, and providing selector means for selecting a profile of the bank so that when a working resource has to be replaced by a spare resource, a profile in the bank corresponding to the profile of the working resource is selected for provisioning the spare resource accordingly.

10. The method according to claim 9, wherein the working and spare resources are embodied in ports of a telecommunication apparatus.

11. The method according to claim 9, wherein the working and spare resources are embodied in boards which perform Adaptation functions that are both originated and terminated at apparatus matrices.

12. The method according to claim 9, wherein the step of providing the at least one spare resource with a bank of profiles comprises the step of providing a memory which is divided into a number of portions with each portion corresponding to a single profile.

13. The method according to claim 9, wherein said set of parameters and configuration information comprises concatenation information.

14. The method according to claim 9, wherein said set of parameters and configuration information comprises adaptation, termination, and monitoring information.

15. The method according to claim 9, wherein the apparatus comprises at least one of an Add/Drop Multiplexer (ADM), a Digital Cross Connect (DXC), a multiservice apparatus and a metro apparatus.

* * * * *